United States Patent
Djeu

(10) Patent No.: US 9,599,518 B2
(45) Date of Patent: Mar. 21, 2017

(54) FIBER OPTIC TEMPERATURE SENSOR UTILIZING A PHOSPHOR MICROSPHERE

(71) Applicant: Nicholas I. Djeu, Tampa, FL (US)

(72) Inventor: Nicholas I. Djeu, Tampa, FL (US)

(*) Notice: Subject to any disclaimer, the term of this patent is extended or adjusted under 35 U.S.C. 154(b) by 255 days.

(21) Appl. No.: 14/161,754

(22) Filed: Jan. 23, 2014

(65) Prior Publication Data

US 2015/0276506 A1    Oct. 1, 2015

(51) Int. Cl.
*G01K 11/32* (2006.01)
*G01K 11/20* (2006.01)

(52) U.S. Cl.
CPC ............... *G01K 11/32* (2013.01); *G01K 11/20* (2013.01)

(58) Field of Classification Search
CPC ...................................... G01K 11/32
USPC ........................................... 374/161
See application file for complete search history.

(56) References Cited

U.S. PATENT DOCUMENTS

| | | | | |
|---|---|---|---|---|
| 5,496,997 A | * | 3/1996 | Pope .................... | G01N 21/643 250/227.21 |
| 5,708,957 A | * | 1/1998 | Chuang .................. | C09K 11/04 422/82.05 |
| 5,968,038 A | * | 10/1999 | Djeu ....................... | A61B 18/28 606/13 |
| 2008/0069180 A1 | * | 3/2008 | Djeu ................... | G01K 11/3213 374/161 |

* cited by examiner

*Primary Examiner* — Lisa Caputo
*Assistant Examiner* — Jamel Williams
(74) *Attorney, Agent, or Firm* — Jerome E Sacks

(57) ABSTRACT

In accordance with the present invention, a fiber optic temperature sensing system incorporating a thermal probe which utilizes a phosphor in the form of a microsphere is provided. The microsphere is situated in air so as to produce a lensing effect in both coupling the excitation light delivered to it by the fiber and coupling the fluorescence produced by the phosphor material back into the fiber. The thermal probe can be implemented in either a flexible or a rigid form. Materials for the phosphor microspheres include—but are not limited to—rare earth(s) doped single crystals, rare earth(s) doped ceramics, and ruby. When coupled to a suitable controller, these thermal probes can provide reliable temperature measurements even in environments characterized by strong electrical noise or electromagnetic interference.

8 Claims, 4 Drawing Sheets

FIBER OPTIC TEMPERATURE SENSOR UTILIZING A PHOSPHOR MICROSPHERE

CROSS-REFERENCE TO RELATED APPLICATIONS

This application claims the benefit of the U.S. Provisional Patent Application No. 61/757,743 filed Jan. 29, 2013 by the present inventor. This provisional patent application is incorporated herein by reference.

BACKGROUND OF THE DISCLOSURE

One type of fiber optic temperature sensor is based on the decay time of the fluorescence emitted by a phosphor, which serves as the active element of its thermal probe. An optical fiber connects the phosphor element, either directly or via a patch cable, to a controller. The controller provides the optical excitation of the phosphor, and receives and analyzes some of its fluorescent emission. When the decay time of the fluorescence exhibits a monotonic dependence on the temperature of the phosphor, a thermometer can be implemented once that dependence is established.

The phosphor is usually in the form of a mini-rod made from a single-crystal material. When the appropriate material is used, exceedingly high temperatures can be measured. In a conventional design, the cylinder is placed inside a closed-ended sheath and the optical fiber is butt-coupled to it (Fernicola et al., Rev. Sci. Instrum. 71, 2938 (2000)). In a more robust construction, the phosphor mini-rod in the form of a doped single crystal is grown directly onto a corresponding undoped single-crystal lead fiber (U.S. Pat. No. 6,045,259). With the latter approach, a maximum temperature of 1,600° C. could be measured by the thermal probe (Kennedy and Djeu, Sensors and Actuators A100, 187 (2002)). However, the fabrication of the probe in either case is very laborious. Moreover, the maximum concentration of a dopant that can be incorporated into a single crystal is often limited by segregation effects, thus restricting the parameter space that can be explored in the optimization of the phosphor.

Microspheres have been used in fiber optic sensors in the past (U.S. Pat. No. 5,496,997 and German patent DE102009005162A1). U.S. Pat. No. 5,496,997 teaches a sensor incorporating an optical fiber and a solid porous inorganic microsphere. In that invention the microsphere is attached to one end of an optical fiber by means of an adhesive. DE102009005162A1 took it one step further. This later invention teaches the creation of a recess at the end of the fiber with matching radius of curvature to that of the microsphere. Then the two parts are joined with an adhesive. In both approaches the tip consists of a contiguous solid structure. The present invention is yet another version of the microsphere approach.

SUMMARY OF THE DISCLOSURE

A fiber optic temperature sensing system incorporating a thermal probe which utilizes a phosphor microsphere as the active element is disclosed herein. Microspheres with high optical quality can be fabricated at very low cost in large volumes. In fact, they can be made from relatively soft glasses to the extremely hard sapphire, and are commercially available as ball lenses at very affordable prices. The ability to produce low cost fiber optic temperature sensing systems is essential to their widespread adoption in a variety of situations because of their immunity to electrical noise and electromagnetic interference. These range from power generating systems and fuel conversion plants to field-enabled processes for materials synthesis, waste treatment and heating.

Useful materials for the phosphor microspheres include doped single crystal and clear polycrystalline ceramic materials developed in recent years for laser applications. The ceramic materials can have lower scattering loss and higher mechanical strength than their single-crystal counterparts (Sanghera et al., Materials 5, 258 (2012)). Ceramic materials have the advantage that they can incorporate dopants much more readily. The ability to include highly doped materials in the optimization of the phosphors can lead to fiber optic temperature sensors with wider operating range and higher accuracy.

Thermal probes incorporating phosphors in the form of microspheres can be made to be either flexible or rigid. Both types will have the microsphere placed inside a close fitting closed-ended tube. A polished optical fiber with substantially the same diameter will be inserted into the tube and made to contact the microsphere. The open end of the tube will then be bonded to the fiber. In the case of the flexible probe, the tube will be short and the fiber long enough to reach the controller. In the case of the rigid probe, the tube will have a length as required by the application and will be fitted with a fiber connector at the open end. It will then be connected to the controller with the use of a patch cable. With currently available materials, the flexible probe will be limited to a maximum operating temperature of approximately 300° C.

The difference between the present invention and prior art is that here one has an air gap between the optical fiber and the phosphor microsphere, except for a single point of contact between the end of the fiber and the microsphere. In this way, the part of the microsphere facing the fiber end acts as a lens. As such, it causes some rays entering the microsphere to have a significantly longer path within the microsphere, thus increasing the absorption of the excitation light by the phosphor. Likewise, rays from the emitted fluorescence in the backward direction that have axial angles larger than the acceptance angle of the fiber can now be focused into the fiber and guided by it to improve the coupling efficiency. Additionally, the construction disclosed here can be taken to much higher temperatures, compared to prior ones in which the microsphere is bonded to the optical fiber.

Figure 1:
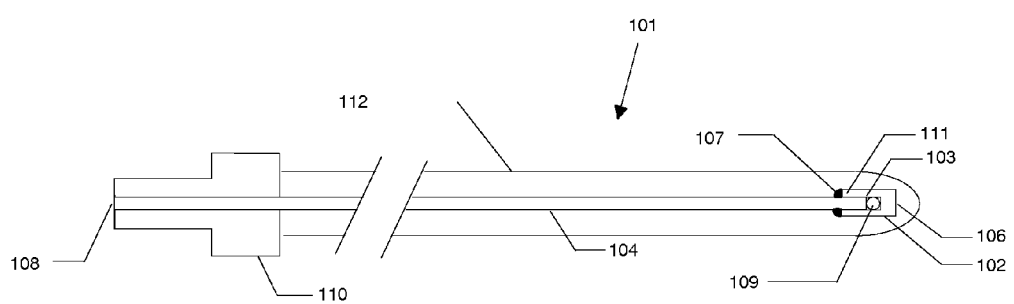
FIG. 1 is a longitudinal schematic view of a flexible thermal probe incorporating a phosphor microsphere.

NUMBER PART NAMES 101 flexible fiber optic thermal probe
102 ceramic tube
103 sensor end
104 optical fiber
105 rigidfiber optic thermal probe 106 closed end
107 adhesive
108 connector end
109 phosphor microsphere
110 fiber connector
111 open end
112 polymer jacket
116 thin ceramic tube
118 thick ceramic tube
119 controller
120 pulsed LED
122 beam splitter
124 lens
126 patch cable
128 detector
130 driver/processor
132 filter

DETAILED DESCRIPTION

As used in this specification if an item appears more than once in a figure, only one may have a numeral lead line. Two similar parts performing similar functions may be assigned the same numeral.

FIG. 1 illustrates a first embodiment of the present invention, a flexible fiber optic thermal probe 101 utilizing a phosphor microsphere 109. The sensor end 103 of an optical fiber 104 is polished and held in contact with the phosphor microsphere 109 inside a ceramic tube 102 having a closed end 106 and an open end 111. Note, however, that the contact occurs at only a single point. Thus, for all intent and purposes, the phosphor microsphere 109 is surrounded by air, which has a much lower index of refraction. Such a construction endows the phosphor microsphere 109 with a built-in lens. The result is that the coupling of the excitation light into the phosphor microsphere 109, as well as of the fluorescence produced therein back into the fiber, are improved. The phosphor microsphere 109 should have a diameter substantially the same as that of the optical fiber 104. The inside diameter of the ceramic tube 102 is sized to be just large enough so as to allow the phosphor microsphere 109 and the optical fiber 104 to pass through. The optical fiber 104 is bonded to the open end 111 of ceramic tube 102 with an adhesive 107 such as an epoxy or cement. The connector end 108 of the optical fiber 104 is terminated in a fiber connector 110. The optical fiber 104 may be covered with a flexible sheath such as a polymer jacket 112. The polymer jacket 112 provides protection for the fiber, albeit at the expense of lengthening the probe's response time.

Figure 2:
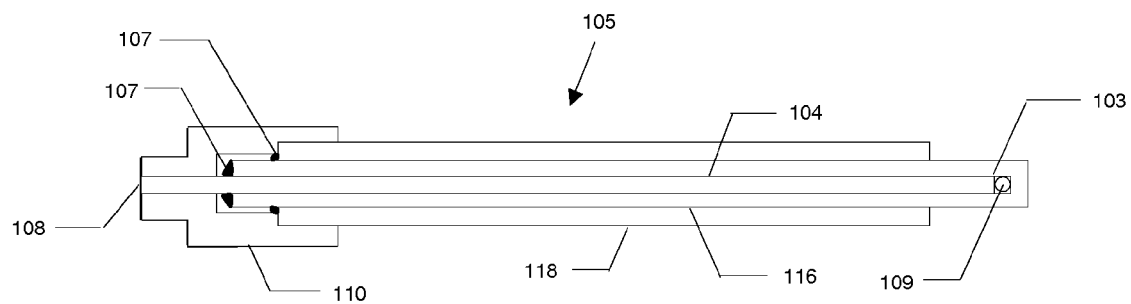
FIG. 2 is a longitudinal schematic view of a rigid thermal probe incorporating a phosphor microsphere.

FIG. 2 illustrates a second embodiment of the current invention, a rigid fiber optic thermal probe 105 utilizing a phosphor microsphere 109. The phosphor microsphere 109 is placed in a close fitting closed-ended thin ceramic tube 116. Then an optical fiber 104 with sensor end 103 that is polished is inserted until it makes contact with the phosphor microsphere 109. The diameter of the optical fiber 104 is substantially the same as that of the phosphor microsphere 109. The optical fiber 104 is bonded to the thin ceramic tube 116 at its open end with adhesive 107. Next, the thin ceramic tube 116 is inserted into a close fitting thick ceramic tube 118 for protection, and bonded to the thick ceramic tube 118 with adhesive 107. Finally, the entire assembly is put into a fiber connector 110, and the connector end 108 of the optical fiber 104 is terminated therein.

The performance and cost of the thermal probe is determined by its desired range of operation. For example, the optical fiber 104 in the rigid fiber optic thermal probe 105 may be of the low-cost all-silica variety, with polyimide buffer. For operation above approximately 300° C. the buffer should be removed first. To avoid differential thermal expansion between the silica fiber and the thin ceramic tube 116, the latter should be made from fused quartz. Such a construction would permit the rigid fiber optic thermal probe 105 to operate to a temperature of approximately 1,300° C. For operation at higher temperatures, the optical fiber 104 may be made from a refractory material such as sapphire. In that case, the thin ceramic tube 116 may be made from alumina in order to minimize the effects of differential thermal expansion relative to the optical fiber 104.

A variety of materials can be used for the phosphor microsphere 109. For operation up to approximately 400° C., a Cr doped $Al_2O_3$ (ruby) ball lens would serve the purpose. To reach higher temperatures, $Al_2O_3$ doped with other ions or rare earth doped materials (with one or more dopants) may be used. In that regard, single crystal and polycrystalline ceramic materials are of particular interest. As noted earlier, ceramic materials permit the incorporation of dopant ions to much higher concentrations than is possible in single crystals, and thus afford the opportunity for a more thorough optimization. Ceramic YAG materials are of special interest because of their excellent clarity. The rare earth dopants include; but are not limited to; Yb, Nd, and a combination thereof.

Figure 3:
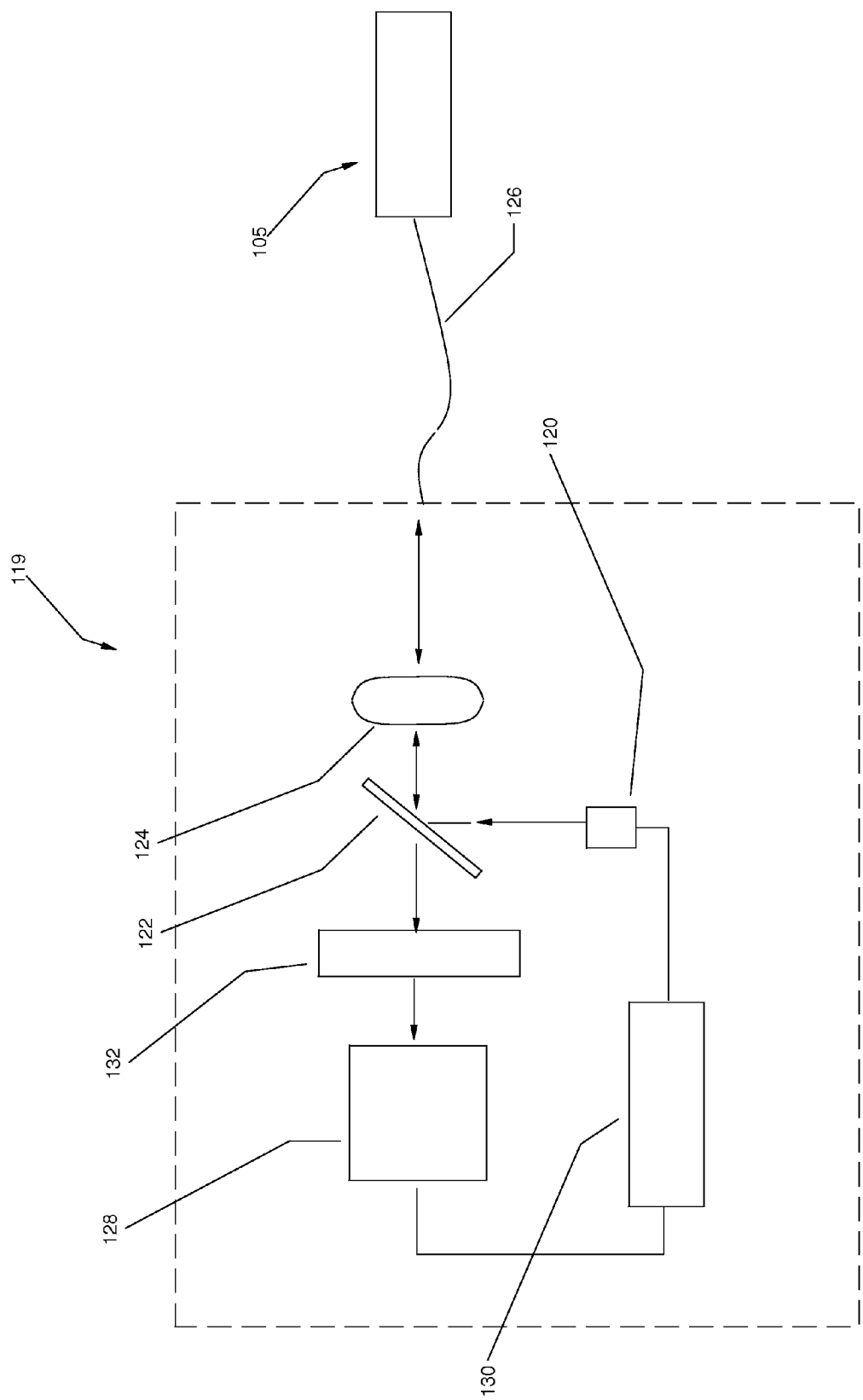
FIG. 3 is a block diagram of a fiber optic temperature sensing system with a rigid thermal probe incorporating a phosphor microsphere.

FIG. 3 illustrates a complete fiber optic temperature sensing system, including a controller 119 and a rigid fiber optic thermal probe 105. Controller 119, which generates the excitation light pulses and processes the received fluorescence signal, is schematically illustrated inside the dashed box in FIG. 3. Excitation is provided by a pulsed LED 120. (In an alternate embodiment a pulsed laser may replace the pulsed LED 120). The excitation light is reflected off a beam splitter 122 and focused by a lens 124 into a patch cable 126. The patch cable 126 is necessary, since the rigid fiber optic thermal probe 105 is rigid. (For the flexible fiber optic thermal probe 101, it may be connected directly to the controller 119). The fluorescence emitted by the phosphor microsphere 109 guided back by the optical fiber 104 (see FIG. 2) and the patch cable 126 is collimated by the lens 124 and made to be incident on a detector 128 after passing through the beam splitter 122 and a filter 132 which removes any unwanted light. The driver/processor 130 represents everything else in the controller 119, including a digital signal processor. The latter controls the pulsing of the pulsed LED 120 or a laser, analyzes the decay of the detected fluorescence signal, and converts it into a temperature reading.

Figure 4:
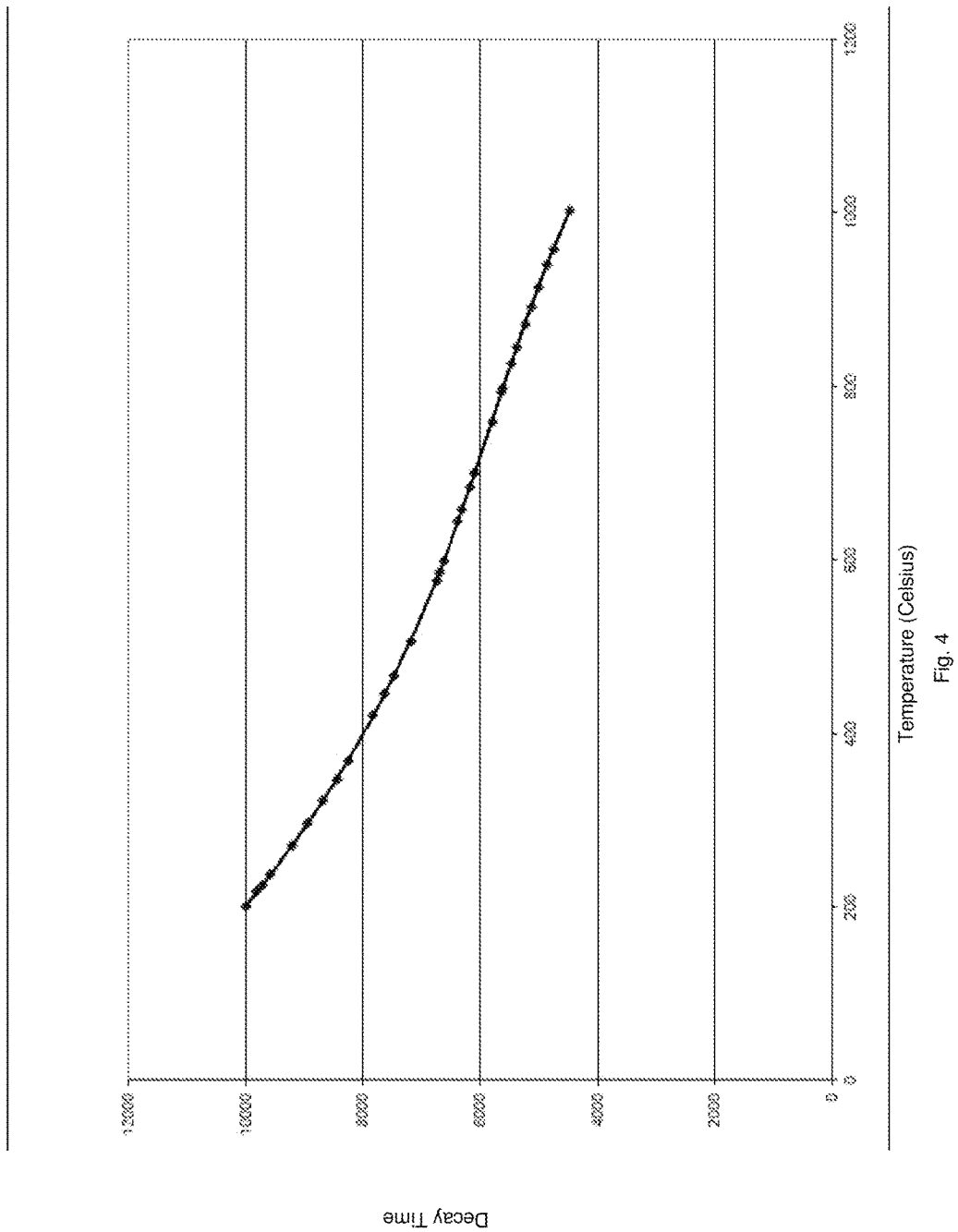
FIG. 4 is a graph for decay time vs. temperature measured with a fiber optic temperature sensing system incorporating a rigid thermal probe which utilizes a ceramic Nd,Yb:YAG phosphor micro sphere.

FIG. 4 shows the variation of the fluorescence decay time with temperature obtained from a rigid fiber optic thermal probe containing a phosphor microsphere fabricated from ceramic YAG doped with Yb and Nd. The horizontal axis is the temperature in Celsius, and the vertical scale is the decay time in arbitrary units. It is seen that the fluorescence decay time varies monotonically with temperature within its range of operation. The data can be fitted to a polynomial as illustrated. Once the thermal probe has been thus calibrated, a microprocessor can be used to convert the measured decay time to a temperature.

The disclosure presented herein gives two embodiments of the invention. These embodiments are to be considered as only illustrative of the invention and not a limitation of the scope of the invention. Various permutations, combinations, variations and extensions of these embodiments are considered to fall within the scope of this invention. Therefore the scope of this invention should be determined with reference to the claims and not just by the embodiments presented herein.

What is claimed is:

1. A fiber optic thermal probe utilizing a phosphor microsphere, wherein said phosphor microsphere is surrounded by air and has a fluorescence decay time that varies monotonically with temperature within its range of operation;
    and wherein said phosphor microsphere is made from a polycrystalline ceramic material;
    and wherein said polycrystalline ceramic material is ceramic YAG doped with one or more dopants.

2. The fiber optic thermal probe of claim 1 wherein said one or more dopants is selected from the group consisting of Yb, Nd, and a combination thereof.

3. A fiber optic thermal probe utilizing a phosphor microsphere, wherein said phosphor microsphere is surrounded by air and has a fluorescence decay time that varies monotonically with temperature within its range of operation;
    and wherein said phosphor microsphere is made from a single crystal;
    and wherein said single crystal is $Al_2O_3$ doped with at least one dopant.

4. The fiber optic thermal probe of claim 3 wherein said at least one dopant is Cr.

5. A fiber optic temperature sensing system, comprising: a fiber optic thermal probe utilizing a phosphor microsphere, wherein said phosphor microsphere is surrounded by air and has a fluorescence decay time that varies monotonically with temperature within its range of operation; and a controller which generates excitation light pulses and processes the received fluorescence signal; and wherein said phosphor microsphere is made from a polycrystalline ceramic material; and wherein said polycrystalline ceramic material is ceramic YAG doped with one or more dopants.

6. The fiber optic temperature sensing system of claim 5 wherein said one or more dopants is selected from the group consisting of Yb, Nd, and a combination thereof.

7. A fiber optic temperature sensing system, comprising: a fiber optic thermal probe utilizing a phosphor microsphere, wherein said phosphor microsphere is surrounded by air and has a fluorescence decay time that varies monotonically with temperature within its range of operation; and a controller which generates excitation light pulses and processes the received fluorescence signal; and wherein said phosphor microsphere is made from a single crystal;
    and wherein said single crystal is $Al_2O_3$ doped with at least one dopant.

8. The fiber optic temperature sensing system of claim 7 wherein said at least one dopant is Cr.

* * * * *